United States Patent
Higuchi

(10) Patent No.: US 6,757,238 B2
(45) Date of Patent: Jun. 29, 2004

(54) DISC CLAMPING DEVICE

(75) Inventor: Daisuke Higuchi, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 145 days.

(21) Appl. No.: 10/016,120

(22) Filed: Dec. 12, 2001

(65) Prior Publication Data

US 2002/0085480 A1 Jul. 4, 2002

(30) Foreign Application Priority Data

Dec. 20, 2000 (JP) ........................................ 2000-386450

(51) Int. Cl.⁷ ............................................. G11B 17/028
(52) U.S. Cl. ..................................... 369/271; 369/270
(58) Field of Search .................................. 369/270, 271

(56) References Cited

U.S. PATENT DOCUMENTS 6,041,033 A  *  3/2000  Otsubo et al.

FOREIGN PATENT DOCUMENTS

| JP | 09198760 A | * | 7/1997 | ......... G11B/17/028 |
| JP | 11296942 A | * | 10/1999 | ......... G11B/17/028 |
| JP | 11306627 A | * | 11/1999 | ......... G11B/17/028 |
| JP | 11306628 A | * | 11/1999 | ......... G11B/17/028 |
| JP | 2000030328 A | * | 1/2000 | ......... G11B/17/028 |
| JP | 2000030333 A | * | 1/2000 | ............ G11B/17/04 |
| JP | 20000182305 A | * | 6/2000 | ......... G11B/17/028 |

* cited by examiner

Primary Examiner—William Klimowicz
(74) Attorney, Agent, or Firm—Hogan & Hartson, LLP

(57) ABSTRACT

According to one embodiment of the present invention, a disc clamping device includes a clamp body including a tip operating portion, wherein the tip operating portion moves downward by a depressed disc. The disc clamping device further includes an engagement body including an entry guide portion to guide the disc along the entry guide portion to a center location. When the clamp body is in an upward position, the uppermost surface of the clamp body is positioned to be the same height as an uppermost surface of the entry guide portion of the engagement body.

19 Claims, 4 Drawing Sheets

FIG. 4
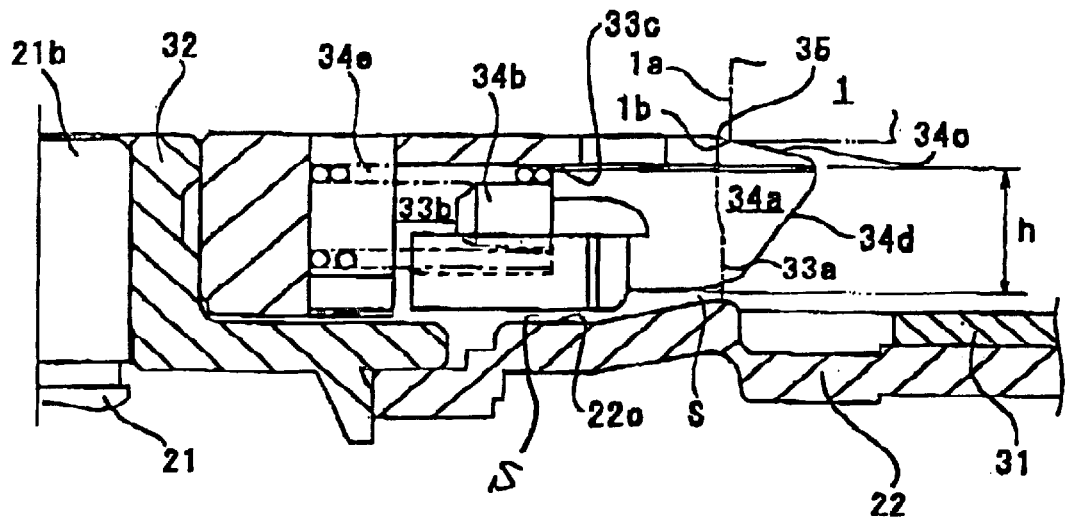
FIG. 5
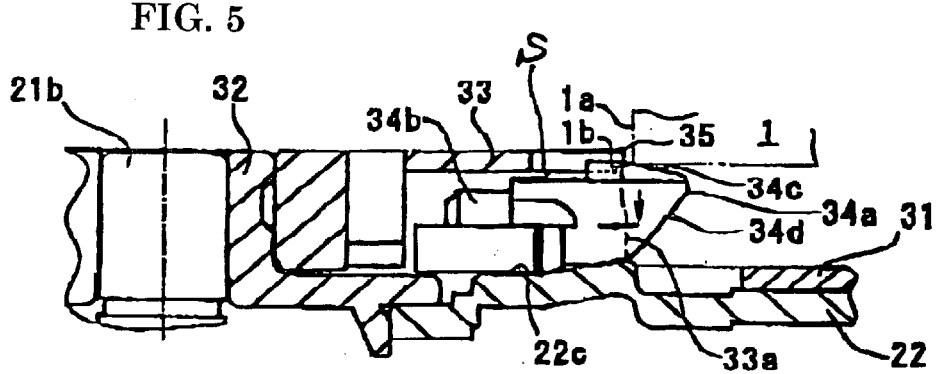
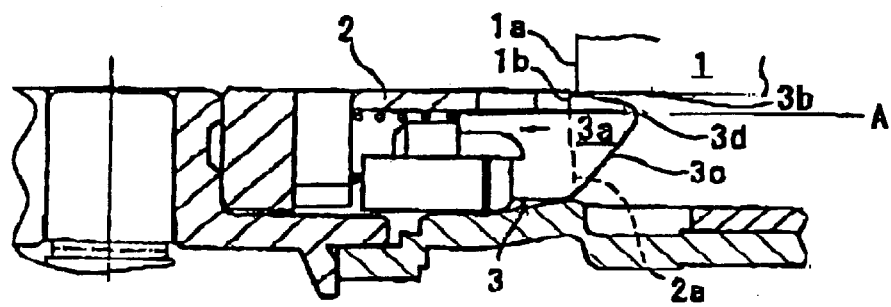
FIG. 6 Prior Art

DISC CLAMPING DEVICE

BACKGROUND OF THE INVENTION

1. Field of the Invention

The present invention relates to a disc clamping device, in which various media discs such as, for example, CDs, DVDs, MDs, CD-ROMs and the like are placed on a turntable and held in a predetermined position by a plurality of clamp bodies protruding in a radial direction outwardly from a center engagement body.

2. Related Art

Generally, when a disc is mounted to a disc clamping device, the disc is easily held in a center position by the clamping device. In a conventional self-clamping device as shown in FIG. 6, a plurality of nail-shaped (circular shaped) clamp bodies 3 are provided so that a tip operating portion 3a of the clamp body 3 can be retracted or extended from an outer peripheral surface 2a of an engagement body 2 through which a center hole 1a of a disc 1 is passes through.

When the center hole 1a of the disc 1 is passed through the engagement body 2, a bottom edge portion 1b of the disc 1 in an axial direction abuts against a displacing inclined surface 3b provided on the upper surface of the tip operating portion 3a of the clamp body 3, since the displacing inclined surface 3b protrudes from the engagement body 2.

When the disc 1 is depressed downward in an axial direction, the clamp body 3 is pushed back into the inside of the engagement body 2 by a generated force of depression in a radial direction.

As shown in FIG. 7, when the disc 1 is mounted in a final fixed location with respect to the engagement body 2, the tip operating portion 3a of the clamp body 3 is pressed in an outward radial direction by a coil spring (not shown), and a holding inclined surface 3c provided on an under surface of the tip operating portion 3a of the clamp body 3 presses against an upper edge portion 1c of the center hole 1a of the disc 1. In this way, the disc 1 is held and fixed by a downward force in an axial direction which is generated by the clamp body 3.

In the conventional self-clamping device having a clamp body 3, when the clamp body's height dimension is reduced in order to make the clamping device thinner, the disc cannot be properly clamped. As shown in FIG. 7, the axial height position A of a top portion 3d, which is formed by a border portion between the displacing inclined surface 3b in the upper surface of the tip operating portion 3a and the holding inclined surface 3c in the under surface of the tip operating portion 3a of the clamp body 3, is set a little higher than the thickness H of the disc 1 in the finally fixed location.

Accordingly, in order to make the height position B of the uppermost surface 3e of the clamp body 3 lower, it is necessary, for example, to make the thickness or the dimension between A and B thinner.

However, when the dimension or the spacing between A and B is made thinner, the angle of the displacing inclined surface 3b becomes more gradual. Consequently the component of a force to make the clamp body 3 to move in a radial direction becomes smaller and the clamp body 3 will not move easily and smoothly. As a result, disc 1 has to be depressed strongly against the displacing inclined surface 3b, which leads to unsatisfactory performance.

Alternatively, a guiding portion for the center hole 1a of the disc 1 can be provided on the top surface of the engagement body 2 to make the positioning operation perform smoothly. However, incorporating the guiding portion makes the entire clamping device thicker and the height of the device still cannot be lowered.

SUMMARY OF THE INVENTION

The present invention provides a thinner disc clamping that is able to clamp and hold a disk in a center position with ease.

According to one embodiment of the present invention, a tip operating portion of a clamp body moves downward by a depressed disc. An entry guide portion provided in an engagement body is exposed and the disc is guided along the entry guide portion to a center location. Thus, the disc is properly centered without a guiding operation by the clamp body.

Also, when the disc has been fully clamped, the tip operating portion of the clamp body is moves upward by an upward reaction force by the disc, and the disc is clamped in a fixed position as the tip operating portion of the clamp body presses the upper surface of the disc.

Accordingly, even if the axial width of the clamp body is smaller than the thickness of the disc, the clamping of the disc is performed without any problems. As the axial dimension of the clamp body is made smaller, the entire height of the clamping device is not increased even though the device includes the entry guide portion.

In accordance with an embodiment of the present invention, when the disc is not being clamped, or when the disc has been clamped and the disc has pushed up the clamp body in an upward position, the uppermost surface of the clamp body is positioned so as to be generally the same height of an uppermost surface of the entry guide portion of the engagement body. Thus the height dimension does not increase and the disc is clamped without any problems.

In addition, in accordance with an embodiment of the present invention, a drive source is a motor, a turntable is fixed to a rotor case which rotates with a rotor shaft of the motor, and clamp bodies are held by the rotor case in such a manner that each of the clamp bodies is movable in a radial direction. Thus, the disc clamping device is suitably integrated with a motor.

Other features and advantages of the invention will be apparent from the following detailed description.

BRIEF DESCRIPTION OF THE DRAWINGS

FIG. 4 shows a longitudinal cross-sectional view to explain the structure of the disc clamping device which is applied to the motor shown in FIG. 1.

FIG. 5 shows a longitudinal cross-sectional view to explain the state at which a disc has begun to be placed on the disc clamping device shown in FIG. 4.

FIG. 6 shows a longitudinal cross-sectional view, corresponding to FIG. 5, which explains the state at which a disc has begun to be placed on a conventional disc clamping device.

PREFERRED EMBODIMENTS OF THE PRESENT INVENTION

Embodiments of the present invention are described as follows. A spindle motor is used as a device to drive various media discs such as CD-ROMs.

Figure 1:
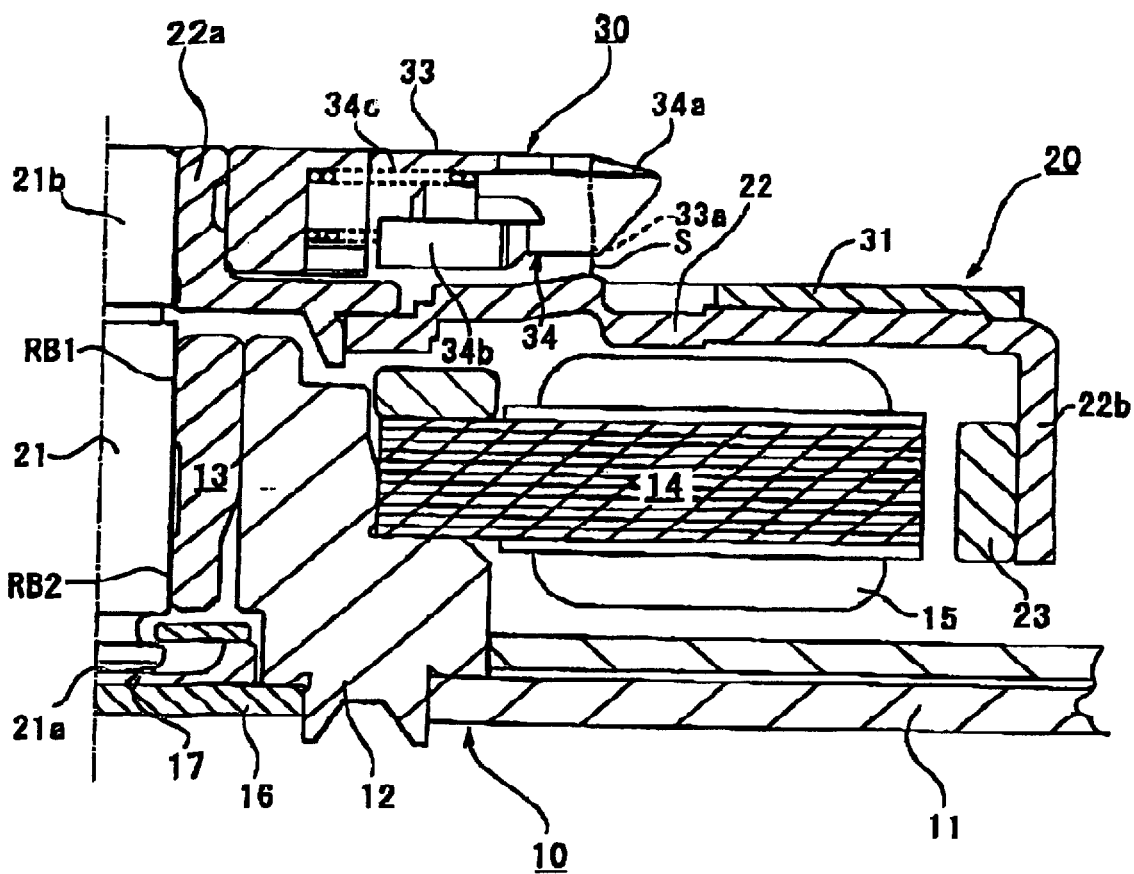
FIG. 1 shows a longitudinal cross-sectional view to explain an example of the present invention which is applied to a CD-ROM motor having a dynamic pressure bearing device.
Figure 2:
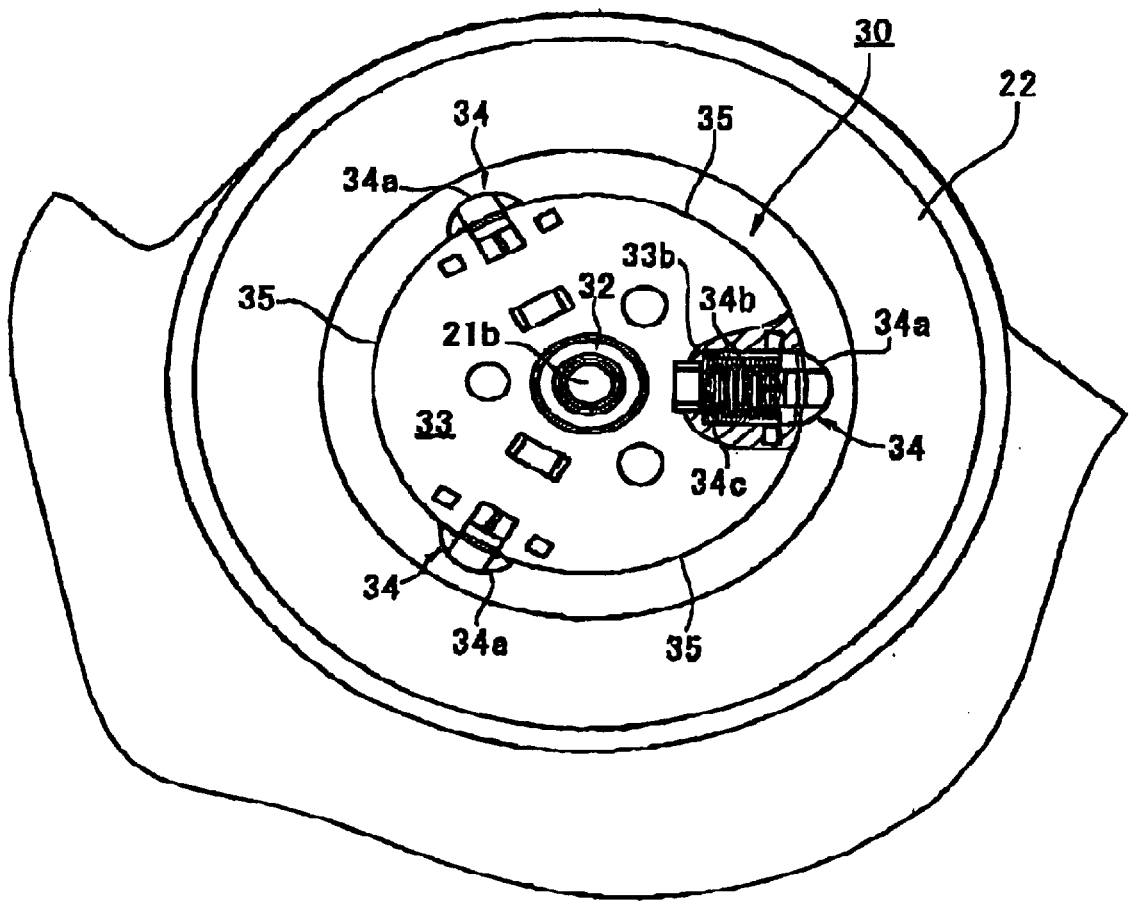
FIG. 2 shows a plane view to explain a structure of a disc clamping device which is applied to the motor shown in FIG. 1.
Figure 3:
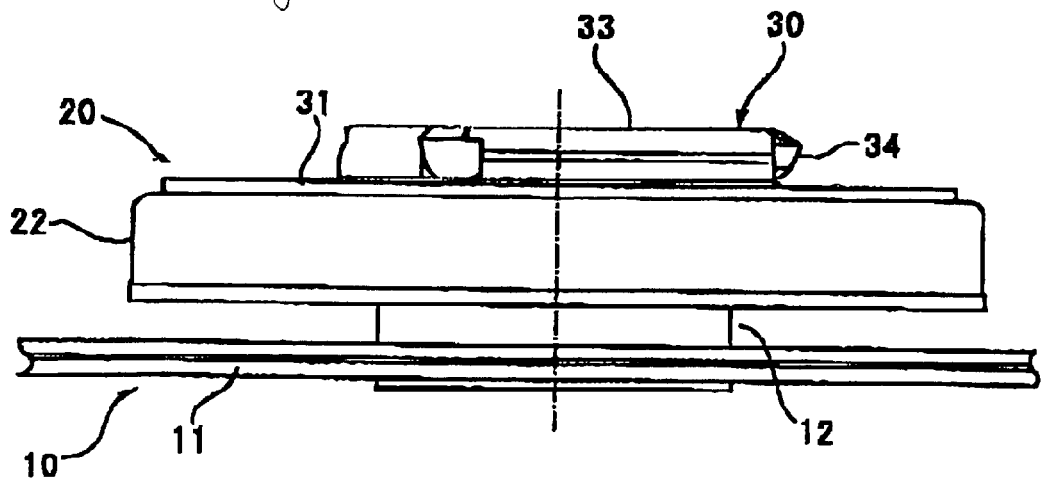
FIG. 3 shows a side view to explain the whole structure of the CD-ROM motor shown in FIG. 1.

The entire spindle motor for a disk driving apparatus of a shaft rotating type shown in FIG. 1, FIG. 2 and FIG. 3 includes a stator assembly 10 as a fixed member and a rotor assembly 20 being a rotatory member which is assembled to the stator assembly 10 in an axial direction.

The stator assembly 10 includes a bearing holder 12 fixed at a generally center area of a fixed plate (base plate) 11 and a generally hollow cylinder-shaped bearing sleeve 13 inserted into the inside of the bearing holder 12. The bearing sleeve 13 is formed from a metal bearing member or a dynamic pressure bearing member and is fixed by an adhesive material (not shown). This bearing sleeve 13 may be joined with the bearing holder 12 by means of press fitting or shrinkage fitting.

The bearing holder 12 is provided with a mounting stop portion formed by an outer peripheral side wall portion on which a stator core 14 consisting of a stacked layered body of magnetic steel sheets is fitted. Each salient pole section of this stator core 14 is wound respectively with a drive coil 15.

The bearing sleeve 13 has a bearing hole which is formed penetrating along a center axis of the bearing sleeve 13. A rotor shaft 21 includes a part of the rotor assembly 2 and is rotatably inserted into the bearing hole. The rotor shaft 21 in the present embodiment is made of stainless steel.

An internal circumferential surface of the bearing hole of the bearing sleeve 13 is provided with dynamic pressure bearing portions RB1 and RB2 which are formed as a convex-shaped portion at two places in an axial direction. Each of the bearing portions RB1 and RB2 is radially faced with a dynamic pressure surface which is formed on an outer circumferential surface of the rotor shaft 21. A lubricant of lubricating oil or magnetic fluid is filled in a very small gap which is formed in each of the bearing portions RB1 and RB2, and the rotor shaft 21 along with the rotor case 22 described below is supported in a radial direction.

On the other hand, the rotor shaft 21 is provided with a pivot portion 21a which is formed as one part of a sphere shape in a bottom end portion of the rotor shaft 21. The bearing holder 12 is fixed and mounted with a thrust plate 16 in an open portion of the bottom end of the bearing holder 12. A disc shaped thrust pad member 17 is provided inside on the thrust plate 16. The thrust pad member 17 is disposed so as to make point contact with the pivot portion 21a of the rotor shaft 21 on the upper surface of the thrust pad member 17 and the entire rotor member including the rotor shaft 21 is supported in a thrust direction.

An upward protruding portion of the rotor shaft 21 is fixed to a center boss portion 22a of an outer-rotor-typed rotor case 22 which is formed like a thin pan shape. The most outer circumferential portion of the rotor case 22 which extends outwardly from the center boss portion 22a in a radial direction is provided with a cylindrical ring portion 22b.

A driving magnet (a permanent magnet) 23 has a ring shape is mounted around the internal circumference of the cylindrical ring portion 22b. A driving magnetized surface formed inside and outside along a peripheral surface of the circular driving magnet 23 is provided to face in proximity with each salient pole section of the stator core 14 outwardly in a radial direction.

A disc clamping device 30 is arranged on the upper surface side of the rotor case 22. The disc clamping device 30 is described in detail below.

As shown in FIG. 1–FIG. 4, a turntable 31 made from a thin circular ring plate member is mounted on an upper surface of the rotor case 22. A disc (not shown) is placed and clamped onto the turntable 31. The turntable 31 is provided with an upward protruding portion 21b of the rotor shaft 21 in its rotating center position and the upward protruding portion 21b of the rotor shaft 21 is fixed with a center boss portion 22a of the rotor case 22 by press fitting, etc. A cylindrical engagement cap body 33 is mounted with an outer circumferential surface of the center boss portion 22a to rotate together with the rotor case 22.

The engagement cap body 33 is provided with three clamp bodies 34, which are arranged such that each of the clamp bodies 34 protrudes radially outward in a radial direction from the outer circumferential surface 33a of the engagement cap body 33. These three clamp bodies 34 are disposed with approximately equal spacing about 120 degrees in a circumferential direction. The tip operating portion 34a of each clamp body 34 which has a generally hemispheric shape, as shown in a planar view, pressure contacts with an internal circumference surface of the center hole of a disc (not shown) to make the center location of the disc to hold coincident with the center of rotation of the rotor shaft 21.

In more detail, the engagement cap body 33 is provided with a clamp body mounting passage 33b which is formed halfway in a radial direction towards the center area from the outer circumferential surface 33a of the engagement cap body 33. The clamp body mounting passage 33b is formed with a radially hollow portion at three locations in a circumferential direction. In each of the clamp body mounting passages 33b, a clamp body 34 is constructed to move back and forth radially. Each clamp body 34 is so arranged that the clamp body 34 can move in a reciprocating manner between the position which is retracted and stored into the inside of the engagement cap body 33 and the position where the tip operating portion 34a which has a generally hemispheric shape in a planar view extends from the outer circumferential surface 33a of the engagement cap body 33. The outward extending amount of the tip operating portion 34a is set to be a little more than that of the tip operating portion 34a being able to contact under pressure with the center hole of the disc.

A trunk portion 34b which is formed in a relatively small diameter extends toward the center side along tip operating portion 34a from a center-side flat wall face of the tip operating portion 34a. The trunk portion 34b is provided with a coiled spring 33c around the outer periphery of the trunk portion 34b in a compressed manner and the force of the coiled spring 33c presses the entire clamp body 34 to protrude outside from the engagement cap body 33 in a radial direction.

The clamp body 34 is moveably accommodated in the clamp body mounting passage 33b in a radial direction and the clamp body mounting passage 33b is formed between the upper wall surface 33c of the engagement cap body 33 and the upper wall surface 22c on the rotor case 22 in an axial direction which is an up-and-down direction as shown in FIG. 3.

The clamp body 34 is accommodated so that it can move also in an up-and-down direction or in an axial direction within the clamp body mounting passage 33b. That is, when the clamp body 34 moves up-and-down, either on the upper surface or the under surface of the trunk portion 34b, it abuts against either the upper wall surface 33c of the engagement cap body 33 or the upper wall surface 22c on the rotor case 22. In this condition, a predetermined gap S in an axial direction is formed on either side of the upper wall surface 33c of the engagement cap body 33 or the upper wall surface 22c on the rotor case 22, that is, on the opposite side of the abutting side.

The predetermined gap S in an axial direction is determined to be smaller than the thickness of the engagement cap body 33, that is, the thickness of the upper part of the upper wall surface 33c.

The clamp body 34 in the present embodiment is positioned by being pushed up by a force of the coiled spring 34c when disc 1 is not passed through the tip operating portion 34a. In other words, the clamp body 34 is held in a state of being movable downward from the upward position which abuts the upper wall surface 33c of the engagement cap body 33. The axial direction gap S is formed between the under surface of the clamp body 34 and the upper wall surface 22c on the rotor case 22.

On the other hand, the tip operating portion 34a of the clamp body 34 is formed like a spire-shape, as shown in a side view, and the tip operating portion 34a is provided with a displacing inclined surface 34c on its upper surface and a holding inclined surface 34d on its under surface. Of these surfaces, the displacing inclined surface 34c is, especially as shown in FIG. 4, so structured as to abut with a lower fringe angle portion 1b of the center hole 1a of a disc 1 in an axial direction when the disc 1 is passed through the tip operating portion 34a. In addition, the holding inclined surface 34d which is provided on the under surface of the tip operation portion 34a is so structured as to abut with an upper fringe angle portion (refer to 1c in FIG. 7) of disc center hole 1a in an axial direction when the disc 1 has been mounted and fixed.

Of these inclined surfaces, an angle of the inclination of the displacing inclined surface 34c is determined to have a relatively sharp slope which is approximately the same as the slope of the conventional angle of the inclination of the displacing inclined surface. However, the holding inclined surface 34d is formed so that the width dimension (thickness) "h" in the axial direction becomes smaller by the gap "S" in an axial direction than the conventional width thickness in the axial direction.

As shown in FIG. 5, while the center hole 1a of a disc 1 is passing through the engagement cap body 33, the lower fringe angle portion 1b of the disc center hole 1a in an axial direction abuts with the upper side displacing inclined surface 34c of the clamp body 34 which protrudes from the cap body 33. And then, by depressing the disc 1 in an axial direction, the clamp body 34 is moved down by the gap "S" in an axial direction and pushed back into the inside of the engagement cap body 33, and thus the disc 1 is passed through the clamp body 34.

In addition, in a final fixed location of the disc 1 with respect to the engagement cap body 33, the holding inclined surface 34d on the under surface of the clamp body 34 engages and presses so as to slightly overlap with the upper fringe angle portion (refer to 1c in FIG. 7) of the disc center hole 1a in an axial direction. By means of the urging force which occurs thereby, pressing the disc in an axial direction downward holds the disc in place. At this time, the clamp body 34 is constructed so as to be pushed up by the above-mentioned axial gap S to the upward position by the reaction force of the urging force with respect to the disc 1, which is generated by the above-mentioned holding inclined surface 34d.

On the other hand, an entry guide portion 35 for guiding the center hole 1a of the disc 1 to the center location is provided in an upper limb portion of the outer circumferential surface 33a of the engagement cap body 33 in an axial direction. This entry guide portion 35 is formed so as to have a little smaller outside diameter than the inside diameter of the disc center hole 1a in such a manner that the engagement cap body 33 is easily inserted into the disc center hole 1a when the disc 1 is being passed through.

The upper surface position of entry guide portion 35 of this engagement cap body 33 is formed at approximately the same height as the upper surface position of the clamp body 34 when the clamped body 34 is pushed up to the upward position, as described above, in a state when the disc 1 has not passed through the clamp body 34.

Accordingly, when the clamp body 34 moves downward as described above by the force of the depressed disc 1 at the time disc 1 passes through the clamp body 34, the entry guide portion 35 is exposed. Thus, the above-mentioned axial direction gap S establishes a dimension so as to expose the entry guide portion 35 when the clamp body 34 is moved down.

In accordance with a disc clamping device according to the present embodiment which is used for a spindle motor having such a construction, as shown for example in FIG. 5, the lower fringe angle portion 1b in an axial direction of the disc center hole 1a abuts with the upper surface of the displacing inclined surface 34c of the clamp body 34 which protrudes from the engagement cap body 33. With this construction, the clamp body 34 moves down as the disc begins to be passed through.

As such, the entry guide portion 35 of the engagement cap body 33 is exposed by the downward movement of the clamp body 34, which results in the disc 1 being guided in the center location along the entry guide portion 35. Accordingly, the centering operation of disc 1 is performed without the guiding operation of the clamp body 34.

Along with the centering operation performed by the entry guide portion 35 of the engagement cap body 33, a component of force in an inside radial direction which occurs due to the depressed force of disc 1 in an axial direction acts on the clamp body 34 while the disc center hole 1a of the disc 1 is passed further downwards with respect to the engagement cap body 33. That is because the displacing inclined surface 34c is formed with a steep slope. Therefore, the clamp body 34 is pushed back and retracts smoothly into the inside of the engagement cap body 33.

Figure 7:
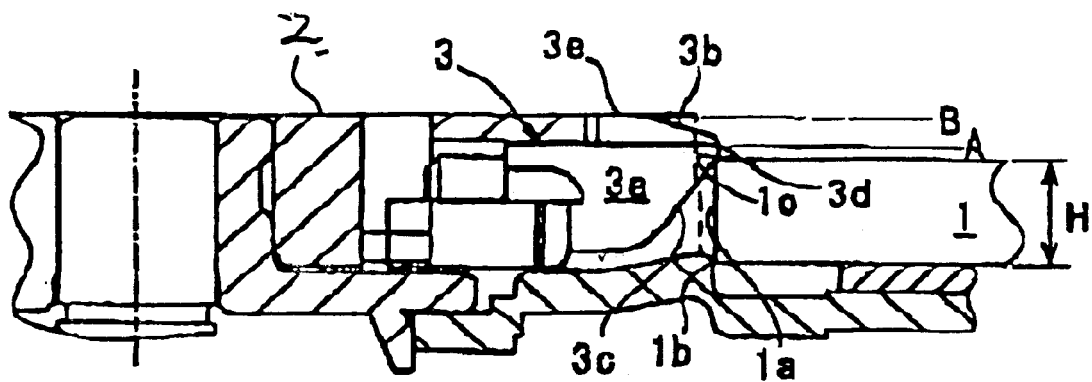
FIG. 7 shows a longitudinal cross-sectional view which illustrates the state when a disc has been passed through the conventional disc clamping device shown in FIG. 6.

Furthermore, on the occasion of fixing the disc 1 after the disc 1 passes through the engagement cap body 33, the under surface of the holding inclined surface 34d of the clamp body 34 overlaps the upper fringe angle portion 1c of the disc center hole 1a from the upper side, and the disc 1 is pushed downwards (see FIG. 7). Thus, the clamp body 34 moves upwards by the reaction force at that time, and then the disc 1 is pressed down and clamped from the upward position of the clamp body 34.

Accordingly, fixing the disc 1 is performed without any problems even if the width dimension h of the holding inclined surface 34d of the clamp body 34 is formed smaller than the thickness dimension H of the disc 1 (h<H).

Therefore, the height of the entire device is reduced by the amount of the axial dimension h minus H (h–H) of the holding inclined surface 34d.

In accordance with the present embodiment, the uppermost surface position of the clamp body 34 is structured so as to be generally the same height as the uppermost surface position of the entry guide portion 35 of the engagement cap body 33 when a disc 1 is not passed through the clamp body 34. Thus the height dimension of the entire device is held lower and its appearance is also satisfactory.

In addition, in accordance with the present embodiment, the drive source is a motor, the turntable 31 is mounted such that it rotates together with the rotor case 22 which rotates together with the motor shaft 21, and the clamp body 34 is held by the rotor case 22 to be capable of moving back and forth in a radial direction. Thus the disc clamping device 30 is preferably integrated with a motor.

The embodiments of the present invention by the inventor has been described above in detail, but the present invention is not limited to the embodiments described above and many modifications can be made without departing from the present invention.

For example, in the above-mentioned embodiments, the clamp body 34 is pushed up and held at an upward position when the disc 1 is not passed through, but clamp body 34 does not always have to be held in the upward position. The important thing is that the clamp body 34 is able to move in an axial direction.

Also, in accordance with the above-described embodiments, the entire clamp body is formed to move up-and-down in an axial direction, but the clamp body can be constructed in such a manner that only the tip operating portion of the clamp body moves up-and-down in an axial direction.

In addition, according to the above-described embodiments, the present invention is applied to a spindle motor for a CD-ROM disk driving apparatus, but this invention is not limited to this. The present invention can be applied equally to a motor which rotates various discs such as hard disks, floppy disks, DVDs, and also applied to various clamping devices for various discs.

The presently disclosed embodiments are to be considered in all respects as illustrative and not restrictive, to the scope of the invention being indicated by the appended claims, rather than the foregoing description, and all changes which come within the meaning and range of equivalency of the claims are therefore intended to be embraced therein.

What is claimed is:

1. A disc clamping device comprising:
    a turntable on which a disc is placed and rotated by a driving source,
    an engagement body which is provided in a rotation center portion of the turntable, to which a center hole of the disc is passed through in an axial direction,
    a plurality of clamp bodies each of which is provided in such a manner that each clamp body is movable between a retracting position which is stored inside of the engagement body and an extending position which extends in a radial direction outward from an outer peripheral surface of the engagement body, each of the clamp bodies arranged such that there is a gap space between an underface of the clamp body and the turntable, such that the clamp body moves entirely downward,
    biasing means by which each of the clamp bodies is pushed outward in a radial direction from the inside of the engagement body for extending and pressing a tip operating portion of the clamp body against an upper part fringe angle portion of the center hole of the disc, wherein,
        when the center hole of the disc passes through the engagement body, each of the clamp bodies is depressed in an axial direction by abutting a lower fringe angle portion of the disc center hole against the upper surface of the tip operating portion of the clamp body and then pushed into the inside of the engagement body such that the disc is attained to be centering and passed through,
        when the disc is positioned in the fixed location, the under surface of the tip operating portion of the clamp body overlaps and presses from the upward side on the upper fringe angle portion of the disc center hole in the axial direction such that the disc is held by means of compulsion force of the clamp body, and
        an entry guide portion to guide centering of the disc center hole is provided in an upper limb portion in an axial direction in an outer circumferential surface of the engagement body, the entry guide portion being exposed when the clamp body moves downward,
    at least the tip operating portion of the clamp body is held so as to have an up and down motion in an axial direction,
    the tip operating portion moves down by force when the disc is depressed to expose the entry guide portion,
    when the disc is located in the fixed location, the tip operating portion is pushed up at the upward position by means of the reaction force of the compulsion force.

2. The disc clamping device as set forth in claim 1, wherein the clamp body is structured such that the uppermost position of the upper surface of the clamp body is generally the same height as the uppermost surface position of the entry guide portion of a center housing body when the disc is passed through or when the disc pushes up the clamp body at the upward position in the fixed location.

3. The disc clamping device according to claim 1, wherein a displacing inclined surface is provided on the upper side of the tip operating portion of the clamp body for abutting with a lower fringe angle portion at the center hole of the disc and a holding inclined surface is provided on the under side of the tip operating portion of the clamp body for abutting with an upper fringe angle portion of the center hole of the disc.

4. The disc clamping device according to claim 1, wherein the driving source is a motor, the turntable is fixed to a rotor case rotating with a rotor shaft of the motor so as to rotate together and the clamp body is held by means of the rotor case such that the clamp body is able to move back and forth on the rotor case in a radial direction.

5. A disc clamping device comprising:
    a turntable on which a disc is rotated by a driving source,
    an engagement body which is provided on the turntable,
    a plurality of clamp bodies each of which is provided in such a manner that each clamp body is movable between a retreated position which is stored inside of the engagement body and a protruding position which protrudes in a radial direction outward from an outer peripheral surface of the engagement body, each of the clamp bodies arranged such that there is a gap space between an underface of the clamp body and the turntable, such that the clamp body moves entirely downward,
    biasing means by which each of the clamp bodies is pushed outward in a radial direction, wherein each of the clamp bodies is held so as to move up and down in an axial direction, and an entry guide portion to guide centering of a disc center hole is provided in an upper and outer circumferential surface of the engagement body, the entry guide portion being exposed when the clamp body moves down by force when the disc is depressed, the entry guide portion being exposed when the clamp body moves downward.

6. A disc clamping device comprising:

a clamp body including a tip operating portion, wherein the tip operating portion moves downward by a depressed disc, the clamp body arranged such that there is a gap space between an underface of the clamp body and a turntable, such that the clamp body moves entirely downward; and an engagement body including an entry guide portion to guide the disc along the entry guide portion to a center location;

wherein when the clamp body is in an upward position, the uppermost surface of the clamp body is positioned to be the same height as an uppermost surface of the entry guide portion of the engagement body, and the entry guide portion of the engagement body being exposed when the clamp body moves downward.

7. The disc clamping device as set forth in claim 6, wherein, the tip operating portion of the clamp body moves upward by an upward reaction force by the disc when the disc has been clamped.

8. The disc clamping device as set forth in claim 7, wherein, the tip operating portion of the claim body presses the upper surface of the disc when the disc is clamped in a fixed position.

9. The disc clamping device set forth in claim 6, wherein, the disc is properly clamped even if the axial width of the clamp body is smaller than the thickness of the disc.

10. The disc clamping device set forth in claim 6, wherein the axial dimension of the clamp body decreases without increasing the height of the clamping device.

11. The disc clamping device set forth in claim 6, wherein the tip operating portion has a hemispheric shape.

12. The disc clamping device set forth in claim 6, further comprising a coil to push the clamp body in an axial direction.

13. The disc clamping device set forth in claim 6, wherein the tip operating portion has a spiral convex shape.

14. The disc clamping device set forth in claim 6, wherein the tip operating portion includes a displacing inclined surface and a holding inclined surface.

15. The disc clamping device as set forth in claim 14, wherein the displacing inclined surface abuts with a lower fringe angle portion of a center hole of the disc in an axial direction when the disc passes through the tip operating portion.

16. The disc clamping device as set forth in claim 14, wherein the holding inclined surface abuts with an upper fringe angle portion of a center hole of the disc in an axial direction when the disc has been mounted.

17. The disc clamping device as set forth in claim 6, wherein the entry guide portion has a smaller outside diameter than the inside of a center hole of the disc.

18. The disc clamping device as set forth in claim 6, further comprising a motor for rotating the turntable.

19. The disc clamping device set forth in claim 18, wherein the turntable is fixed to a rotor case rotating with a rotor shaft of the motor so as to rotate together.

* * * * *